US007207260B2

(12) United States Patent
Thierry et al.

(10) Patent No.: US 7,207,260 B2
(45) Date of Patent: Apr. 24, 2007

(54) RECIPROCATING HYDRAULIC MACHINE, ESPECIALLY A MOTOR, AND DOSING APPARATUS COMPRISING SUCH A MOTOR

(75) Inventors: Gaetan Thierry, Lignan de Bordeaux (FR); David Higham, Mios (FR); David Vacher, Latresne (FR)

(73) Assignee: Dosatron International, Tresses (Bordeaux) (FR)

( * ) Notice: Subject to any disclaimer, the term of this patent is extended or adjusted under 35 U.S.C. 154(b) by 0 days.

(21) Appl. No.: 10/536,358

(22) PCT Filed: Nov. 4, 2003

(86) PCT No.: PCT/FR03/03291

§ 371 (c)(1), (2), (4) Date: May 26, 2005

(87) PCT Pub. No.: WO2004/051085

PCT Pub. Date: Jun. 17, 2004

(65) Prior Publication Data

US 2006/0037465 A1 Feb. 23, 2006

(30) Foreign Application Priority Data

Nov. 28, 2002 (FR) .................................. 02 14924

(51) Int. Cl.
*F01B 31/02* (2006.01)
*F16J 10/00* (2006.01)

(52) U.S. Cl. .......................... 91/346; 91/303; 92/171.1

(58) Field of Classification Search .................. 91/303, 91/344, 346; 92/171.1
See application file for complete search history.

(56) References Cited

U.S. PATENT DOCUMENTS

| | | | | |
|---|---|---|---|---|
| 2,808,815 | A * | 10/1957 | Cromwell | 91/346 |
| 4,756,329 | A | 7/1988 | Cloup | |
| 5,234,322 | A | 8/1993 | Daniels et al. | |
| 6,129,526 | A | 10/2000 | Kelly | |
| 6,499,384 | B1 * | 12/2002 | Blair | 91/344 |
| 6,901,960 | B2 * | 6/2005 | Roberts et al. | 92/171.1 |

FOREIGN PATENT DOCUMENTS

| | | |
|---|---|---|
| FR | 2 789 445 A | 8/2000 |

* cited by examiner

*Primary Examiner*—Michael Leslie
(74) *Attorney, Agent, or Firm*—Connolly Bove Lodge & Hutz LLP

(57) ABSTRACT

A hydraulic motor comprises a body and a piston able to slide in a reciprocating movement in a cylindrical housing of the body. A chamber (C1, C2) is formed on each side of the piston and hydraulic switching means are provided for feeding and evacuating the respective chambers (C1, C2), these switching means being able to adopt two stable positions. Control means (H) having elastic means for abruptly bringing about changes in the position of the switching means are included. There are triggering means (13, 15) able, at the end of the stroke of the piston (9), to bring about the change in position of the switching means (G). The piston (9) has a closed cross section and the switching means (G) are arranged in the body (1) of the machine, redially on the outside of the cylindrical housing (7) in which the piston (9) slides.

18 Claims, 4 Drawing Sheets

RECIPROCATING HYDRAULIC MACHINE, ESPECIALLY A MOTOR, AND DOSING APPARATUS COMPRISING SUCH A MOTOR

FIELD OF THE INVENTION

The invention relates to a hydraulic machine of the kind comprising:

- a body;
- a piston able to slide in a reciprocating movement in a cylindrical housing of the body, a chamber being formed on each side of the piston;
- hydraulic switching means for feeding and evacuating the respective chambers, these switching means being able to adopt two stable positions;
- control means for an abrupt change in the position of the switching means, comprising elastic means;
- and triggering means able, at the end of the stroke of the piston, to bring about the change in position of the switching means.

BRIEF DESCRIPTION OF THE INVENTION

The invention relates more particularly, although not exclusively, to hydraulic motors. However, the invention could apply to other machines, such as hydraulic pumps.

A hydraulic motor of this kind equipping a metering device for injecting an additive into a main liquid, which is under enough pressure to actuate the motor, is known, for example from FR-2 789 445 or U.S. Pat. No. 4,756,329.

These hydraulic machines, particularly the motors, are satisfactory. However, they are relatively bulky, their size being greater than twice the stroke of the piston, in the direction in which the piston moves.

A first object of the invention is to afford a hydraulic machine of the kind in question whose bulk, particularly in the direction of travel of the piston, is smaller.

Another object is to improve the sealing of the switching means and prevent the position of the piston from having an influence on these switching means.

Another object of the invention is to provide a hydraulic machine of a simple structure able to clearly define the strokes of the piston, particularly in order to provide precise metering in the case of a motor coupled to a metering device.

According to the invention, a hydraulic machine, particularly a hydraulic motor, of the kind defined hereinabove, is characterized in that:

- the piston is a simple, piston, having a closed cross section;
- and the switching means are arranged in the body of the machine, radially on the outside of the cylindrical housing in which the piston slides.

Ducts are provided in the body in order to feed and evacuate liquid to and from chambers connected with the switching means.

Advantageously, the body of the machine comprises, on the inside, an exchangeable cylindrical liner defining the cylindrical housing for the piston. This cylindrical liner may be made of a different, more wear-resistant, material than that of the body.

The body of the machine can be cylindrical and have a first geometric axis, and the cylindrical housing for the piston has a second geometric axis parallel to the first but offset radially.

The switching means can comprise two valves comprising seats situated in the body, or in a piece that is fixed relative to the body, one valve letting liquid in and the other valve letting it out.

The valves are preferably housed in the part of the body situated, with respect to the geometric axis of the body, on the opposite side to the geometric axis of the housing for the piston.

Each valve may comprise a cylindrical passage open at each axial end to communicate with one of the chambers delimited by the piston. Each passage is equipped with a seat at each of its ends, and a plunger able to move axially in the passage is able, depending on its position, to close one of the ends of the passage by pressing against the corresponding seat.

As a preference, the geometric axes of the passages of the two valves are parallel to one another and parallel to the direction of travel of the piston. The passages may be adjacent to one another, separated by a wall.

Each plunger may comprise, toward each end, a bulge advantageously equipped with a seal able to press against a corresponding seat, and the region situated more or less mid-way along the passage communicates with an inlet or outlet duct opening to the outside. This duct may have an axis at right angles to that of the valve passage and intersect this passage.

Advantageously, the plungers of the valves are coupled to a valve cage able to move parallel to the direction of the axes of the valve passages. This valve cage may be arranged in a housing of the body situated on the opposite side of the valves to a cover that closes the body. The valve cage may occupy two stable positions.

The control means for an abrupt change in the position of the switching means and of the valve cage are advantageously formed by a rocker device directed overall at right angles to the direction of travel of the piston. The rocker may comprise a link rod articulated, at its end furthest from the valve cage, to a pin borne by the body of the machine, and a rotary arm articulated to the same pin, this arm being longer than the link rod and bearing, at its end furthest from the articulation pin, a striker able to move in a window of the valve cage; a leaf spring in the shape of an arc of a curve is compressed between two pins secured respectively to the link rod and to the arm. The two stable positions of the rocker correspond to two configurations whereby the link rod is on one or other side of the arm.

A plug forming an end stop is mounted such that it can be turned in the housing of the body underneath the valve cage and, in a given angular position, allows the valve cage to be halted more or less mid-way through its travel so as to provide a bypass function.

A valve with a preloaded spring is advantageously arranged between the inlet and the outlet so as to open should the pressure drop increase.

The invention also relates to a metering device equipped with a hydraulic motor constituting a machine as defined hereinabove, characterized in that it comprises an injection device comprising a cylindrical metering body fixed to the body of the motor, coaxial with the housing for the piston of the motor, and a piston plunger coupled to the piston and sliding in the metering body.

Apart from the provisions set out hereinabove, the invention consists in a certain number of other provisions which will be dealt with more explicitly hereinbelow with reference to an exemplary embodiment described in detail with reference to the attached drawings, but which is not in any way limiting. In these drawings:

BRIEF DESCRIPTION OF THE FIGURES.

The drawings, particularly FIGS. 1 and 2, show a metering device D comprising a hydraulic motor M of cylindrical overall shape, and an injection device I fixed under the motor.

DETAILED DESCRIPTION OF THE INVENTION

Figure 2:
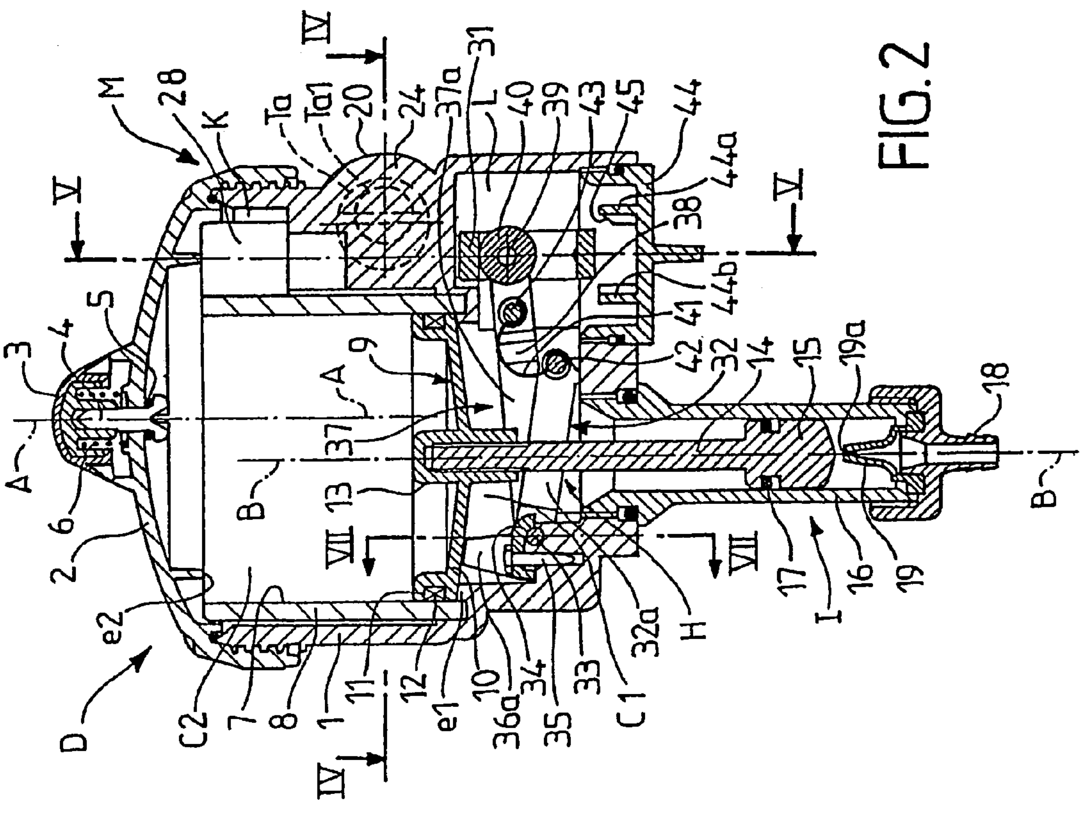
FIG. 2 is a section on II—II of FIG. 1, the piston being in a bottom position and the switching means in the position that causes the piston to rise again.
Figure 1:
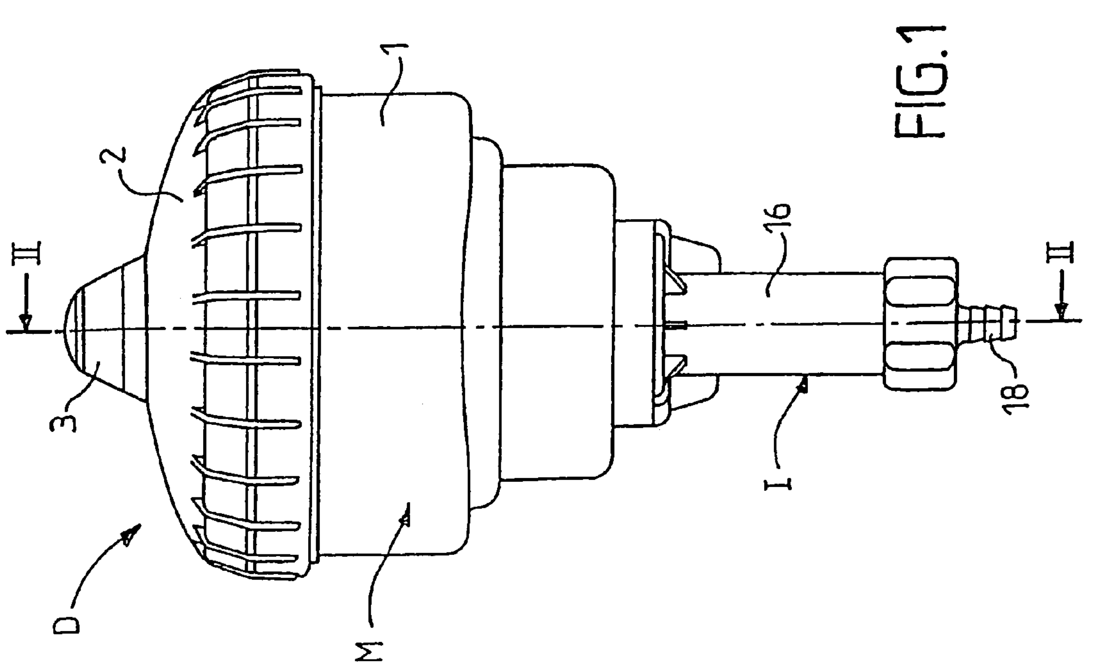
FIG. 1 is a vertical elevation of a metering device with hydraulic motor according to the invention.

The motor M comprises an essentially cylindrical body 1 with a circular cross section of vertical geometric axis A—A. The body 1 is closed, at the top, by a cover 2 screwed onto an external screw thread of the upper end of the body 1. The cover 2 is equipped at its center with a vent button 3 comprising a threaded hole into which the end of a screw 4 is screwed. The plug 3 is covered with a deformable boot made of flexible material. The screw 4 passes through a hole made in the cover 2 and the screw head lies inside the cover. An O-ring seal 5 is provided around the screw 4 inside the cover 2 to be pressed in a sealed fashion by the screw head against the cover. A compression spring 6 is arranged on the outside of the cover 2 between the button 5 and the cover. The spring 6 pushes back the button 3 and presses the seal 5 against the cover. Pressure on the button 3 allows the screw 4 to be pushed in and the device vented to atmosphere by air or fluid passing between the screw and the wall of the hole in the cover.

A cylindrical housing 7 of axis B-B parallel to the axis A—A but radially offset is delimited by an exchangeable cylindrical liner 8 held removably in the body 1.

The liner 8 may be made of a different, more wear-resistant, material than that of the body 1. For example, the body 1 is made of PVC, while the liner 8 is made of glass or HDPE (high density polyethylene). Of course, the liner 8 could be made of the same material as the body 1, for example PVC, as the case may be.

Figure 8:
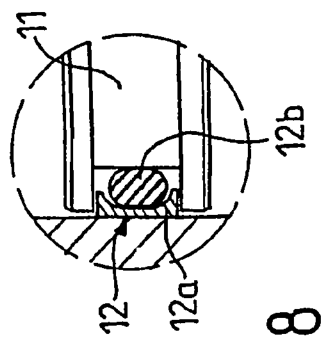
FIG. 8 is a cross section of a sealing ring for the piston.

A piston 9 is able to slide with a reciprocating movement in the direction of the axis B, inside the housing 7. This piston 9 is a simple, piston, which has a closed cross section 10 devoid of any opening. The piston 9 forms a kind of slightly frustoconical disk, the concave side of which faces toward the cover 2. The peripheral edge of the piston 9 comprises an annular groove 11 in which a sealing ring 12 is housed, this ring being depicted in detail in FIG. 8. The piston 9 is generally made of a plastic, for example polypropylene or polyethylene.

The ring 12 comprises an outer ring section **12*a* made of a material with a low coefficient of friction, for example PTFE (polytetrafluoroethylene), having a concave interior surface in which an inner ring section 12*b*, for example toric, is housed, this being made of a material that is not so hard, particularly of an elastomeric material, the cross section of which is compressed. The ring section 12*b* exerts radial thrust outward on the ring section 12*a* to press it against the wall of the housing 7**.

The bottom end of the stroke and the top end of the stroke of the piston 9 are determined respectively by end stops e1, e2 which have a determined fixed position with respect to the body 1. The bottom end stop e1 may be formed by a shoulder provided directly on the body, while the top end stop e2 may consist of a flange projecting downward under the cover 2.

Two chambers C1, C2 are formed in the body 1 on each side of the piston, below and above the piston 9 respectively.

The piston 9 comprises, at its center, a coaxial cylindrical sleeve 13 closed at the cover 2 end and open at the opposite end. The upper end of the rod 14 of a piston plunger 15 is fixed in the sleeve 13, particularly by screwing. The piston plunger 15 can slide in a tubular element 16 of the injection device I, fixed in a sealed manner under the lower part of the body 1, coaxial with the liner 8. The piston plunger 15 comprises an annular groove fitted with a piston plunger seal 17 designed to allow liquid to pass when the piston plunger 15 descends, and to prevent any passage of liquid as the piston plunger 15 ascends.

The lower end of the tubular element 16 is equipped with a screw-on splined coupling 18 with a valve 19 comprising a slot **19*a* at its middle. The valve 19 opens as the piston plunger 15 ascends (intake phase) and closes as the piston 15 descends (delivery or injection phase). A pipe, not depicted, which dips down into a container containing a liquid additive to be injected into the main liquid is connected to the coupling 18**. This main liquid is formed for example of water under sufficient pressure, which operates the motor M.

Figure 4:
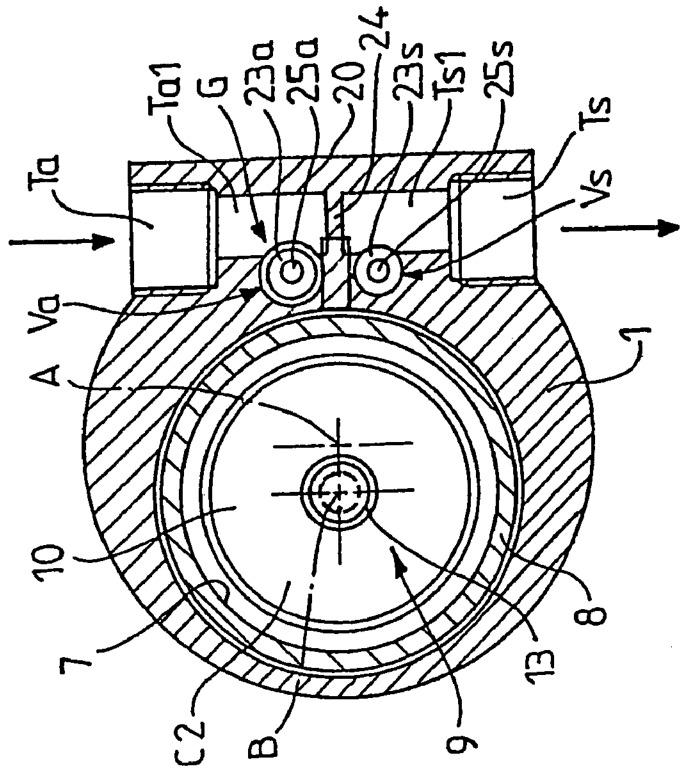
FIG. 4 is a horizontal section on IV—IV of FIG. 2.

Hydraulic switching means G (FIGS. 4–6) allow liquid to be fed to and evacuated from the chambers C1 and C2.

The switching means G are arranged in the body 1 radially on the outside of the cylindrical housing 7 and of the liner 8. The means G are housed in a region of the body 1 situated, with respect to the axis A, on the opposite side to the axis B. To make it easier to house the means G, the body 1 may comprise, in this region, a bulge 20 forming a portion of a cylinder, the generatrices of which are at right angles to the axis A.

The switching means G comprise two valves Va, Vs, for letting the liquid in and out respectively, depicted schematically by arrows.

The seats **21*a*, 22*a* and 21*s*, 22*s* of the valves Va and Vs are situated on the body 1** or on a piece that is fixed with respect to the body.

Each valve comprises a cylindrical passage **23*a*, 23*s* provided in the body 1, the axis of which is parallel to the axis A of the body and which open, at their upper axial ends, into a space K situated radially on the outside of the wall 8. The space K communicates, at its top, with the chamber C2. At its lower axial end, each passage 23*a*, 23*s* opens into a housing L communicating with the chamber C1. The passages 23*a*, 23*s* are separated from one another by a median wall 24 of the body 1**.

Each valve comprises a plunger **25*a*, 25*s* with two axially separated bulges respectively fitted with O-ring seals 26*a*, 26*s* and 27*a*, 27*s***.

The seat **21*a* for the seal 26*a*, provided at the bottom of the passage 23*a*, is formed by a frustoconical surface diminishing in diameter toward the bottom and provided directly in the body 1. The seat 22*a*, provided at the upper part, is formed by a frustoconical surface diminishing in diameter toward the top. This seat 22***a* is situated at the lower end of a cylindrical component 28 comprising a lower part, the outside diameter of which is smaller than that of the upper part. A shoulder 29 is formed at the transition between the two outer surfaces. The lower part of the piece 28 is housed in a bore in the body 1, coaxial with the passage 23*a*. The shoulder 29 comes into axial abutment against the upper edge of the bore of the body 1. The component 28 is kept in a fixed position by the bearing of the flange e2 of the plug 2 against its upper edge.

The seats 21*s* and 22*s* consist of frustoconical surfaces provided directly on the body 1 and increasing in diameter from the passage downward and upward respectively.

The lower ends of the plungers 25*a*, 25*s* are fixed by screws 30*a*, 30*s* against the upper wall of a valve cage 31 formed of a more or less rectangular surround. The valve cage 31 comprises a window open on its two sides parallel to the plane passing through the axes of the plungers 25*a*, 25*s*. The valve cage 31 is arranged in the housing L of the body 1 situated below the valves Va, Vs. The valve cage 31 is in contact with two opposing regions of the wall of the housing L, which guides the sliding of this valve cage.

The entry of liquid into the motor comprises an internally threaded hole Ta allowing a coupling to be fitted. The hole Ta is extended by a duct Ta1 offset radially toward the outside and of smaller diameter than Ta. This duct Ta1 intersects the passage 23*a* at right angles and communicates with it.

Similarly, a threaded hole Ts and a duct Ts1 are provided for establishing a connection between the passage 23*s* and the outlet. The duct Ts1 intersects the passage 23*s* at right angles. The wall 24 separates the inlet duct Ta1 from the outlet duct Ts1.

Figure 9:
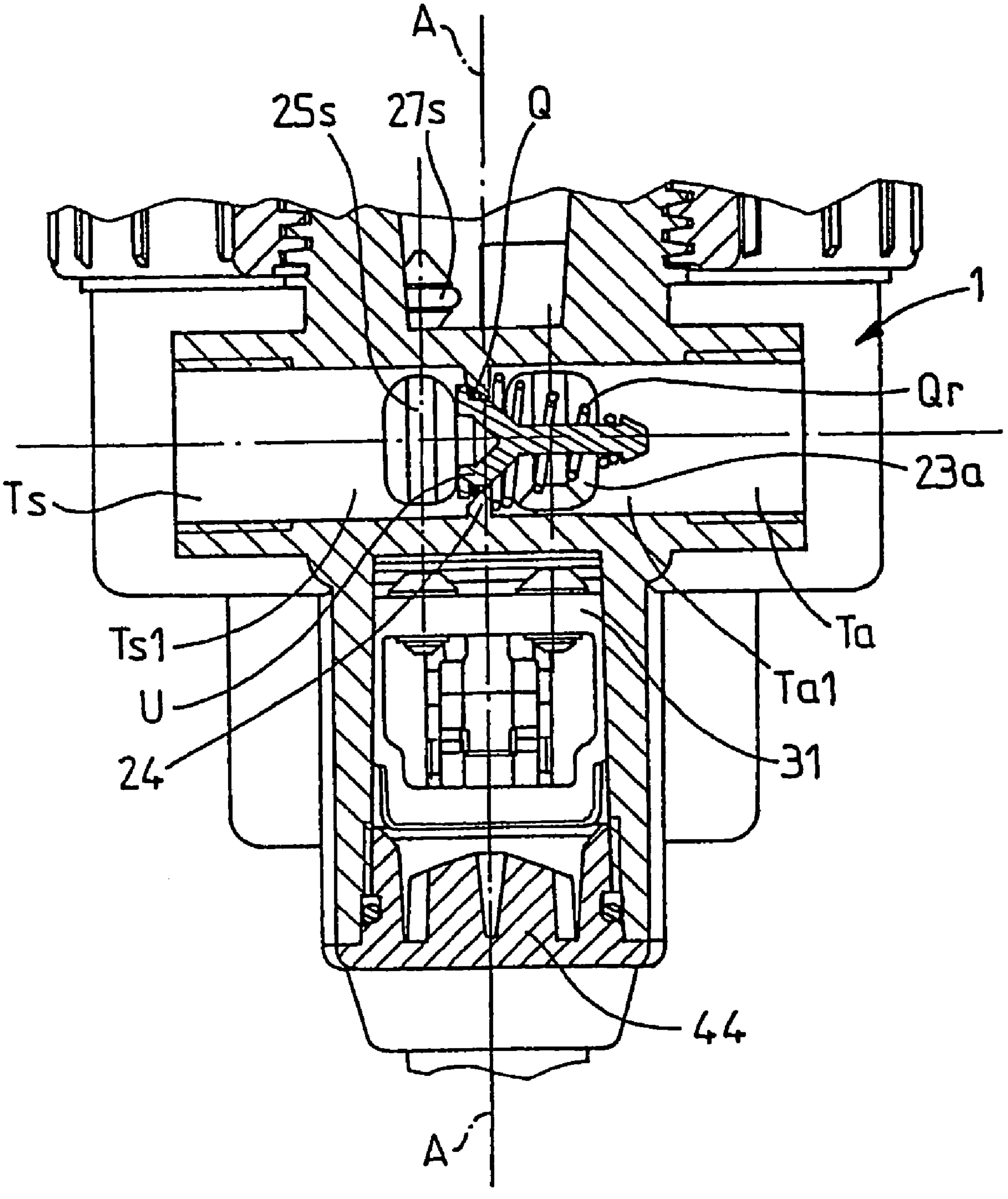
FIG. 9 is a vertical section of an alternative form of embodiment, the section being taken along the line of the geometric axes of the inlet and outlet ports.

According to the alternative form illustrated in FIG. 9, the duct Ta1, instead of being off-centered, is coaxial with the inlet hole Ta, and of the same diameter. The same is true of the outlet duct Ts1 and the outlet hole Ts. Molding the body 1 out of plastic is easier in this alternative form. Advantageously, Ta, Ta1, Ts, Ts1 are coaxial.

A rocker device H constitutes a control means for an abrupt change in the position of the valve cage 31 and of the switching means G.

Figure 5:
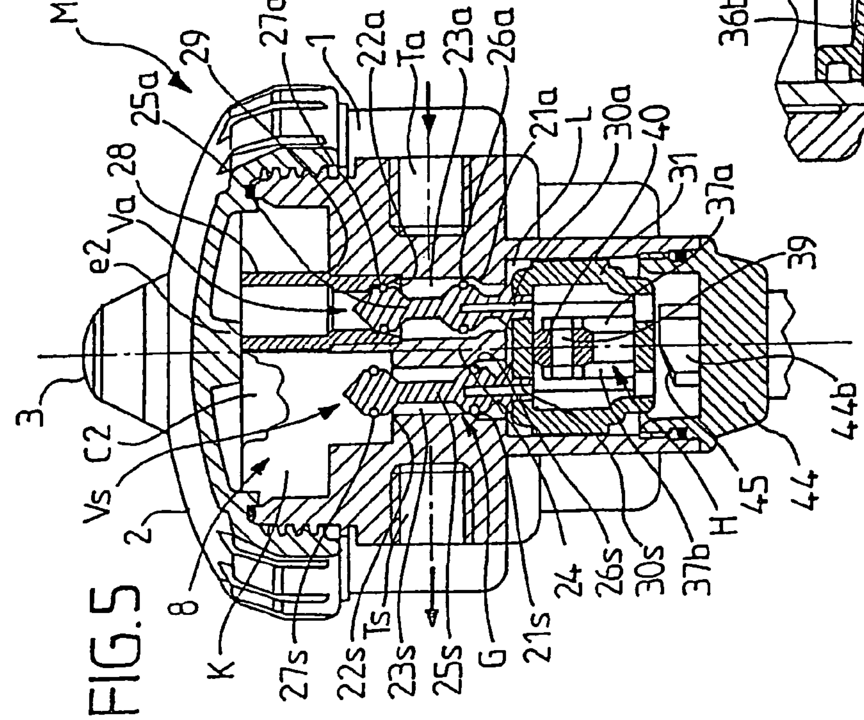
FIG. 5 is a vertical section on V—V of FIG. 2.

The switching means G, in a first stable position illustrated in FIG. 5 (corresponding to the top position of the valve cage 31), on the one hand allow liquid to enter the housing L and the chamber C1 and, on the other hand, provide a connection between the chamber C2 and the outlet. In this configuration, the plunger 25*a* bears via its seal 27*a* against the seat 22*a* and closes off the communication with the chamber C2. By contrast, the seal 26*a* is off the seat 21*a* and allows communication with the housing L and the chamber C1. As far as the other plunger 25*s* is concerned, the seal 27*s* is off the seat 22*s* and allows the passage 23*s* to communicate with the space K and the chamber C2. The seal 26*s* is pressed against the seat 21*s* and cuts off any communication between the passage 23*s* and the chamber C1. Fluid is let into the chamber C1, while the chamber C2 is connected to the outlet.

A second stable position (FIG. 6) corresponds to the bottom position of the valve cage 31, with closure of the seat 21*a*/opening of the seat 22*a*, and closure of the seat 22*s*/opening of the seat 25*s*. In this configuration, the housing L and the chamber C1 are connected to the outlet Ts, while the space K and the chamber C2 are connected to the inlet Ta.

Figure 6:
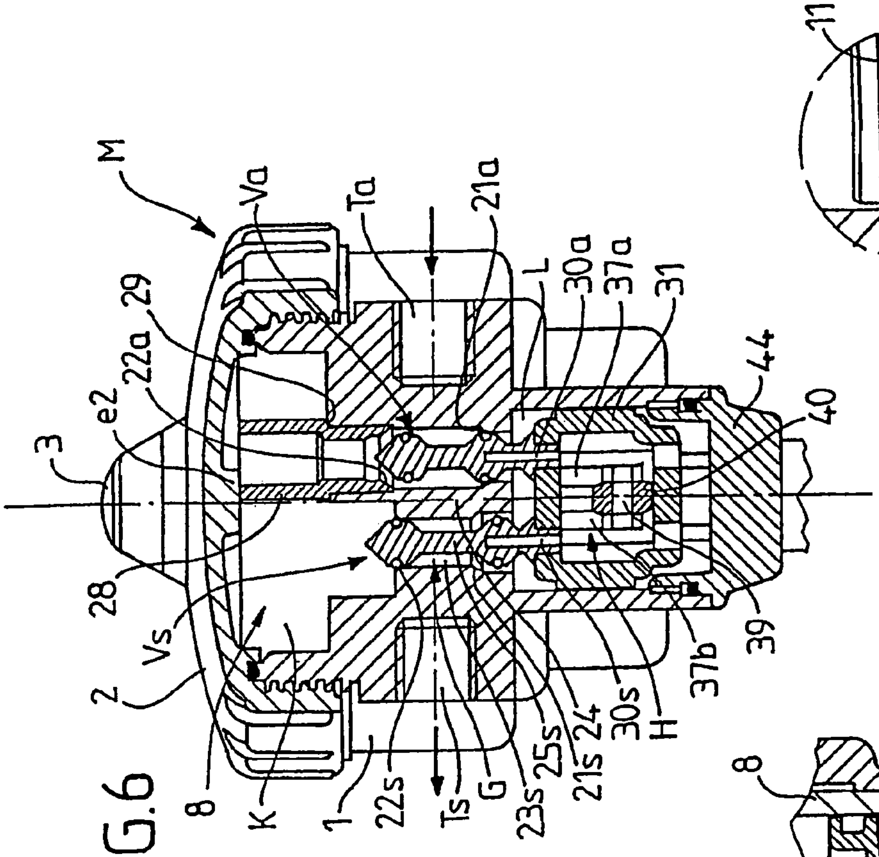
FIG. 6 is a vertical section on VI—VI of FIG. 3.
Figure 7:
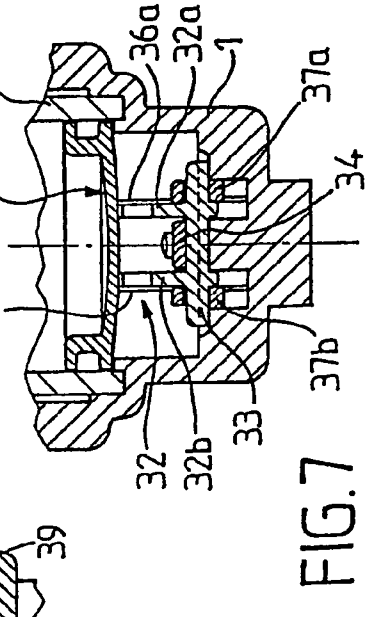
FIG. 7 is a vertical part section on VII—VII of FIG. 2.

The rocker H allows the valve cage 31, and the plungers 25*a*, 25*s* of the valves, to be switched abruptly from the top position in FIG. 5 to the bottom position in FIG. 6, and vice versa. The overall direction of the rocker H is more or less at right angles to the axis B—B of the housing 7, that is to say to the direction of travel B—B of the piston 9.

The rocker H comprises a link rod 32 comprising two parallel branches 32*a*, 32*b* between which the rod 14 of the piston plunger 15 passes. The end of the link rod 32 furthest from the valve cage 31 is articulated via a pin 33 at right angles to the plane passing through the axes A and B. The pin 33 is held in a housing in the body 1 by a clamp 34 held by a screw 35 inside the body 1. The link rod 32 comprises, at each rear end of its branches, an upward projection 36*a*, 36*b* of more or less trapezoidal outline. The overall direction of the link rod 32 in the stable position of FIG. 2 and FIG. 5 is slightly inclined, from the pin 33 downward with respect to a plane at right angles to the axis B.

The rocker H also comprises an arm 37 formed of two branches 37*a*, 37*b* situated on each side of the branches 32*a*, 32*b* of the link rod 32. The branches 37*a*, 37*b* are articulated to the pin 33. The length of the branches 37*a*, 37*b* is greater than that of the link rod 32. The branches 37*a*, 37*b* are cranked toward each other, in a region 38 beyond the free end of the link rod 32, so that their separation decreases. The branches 37*a*, 37*b* at their end furthest from the pin 33 fit into the valve cage 31 and carry a pin 39 on which a striker 40 in the form of a circular ring is mounted.

As an alternative, the striker 40 may be included in the arm 37 to form just a single piece with this arm.

A leaf spring 41 in the shape of an arc of a curve is compressed between a pin 42 borne at the end of the link rod 32 facing toward the valve cage, and a pin 43 borne by the branches 37*a*, 37*b* of the arm 37 beyond the end of the link rod 32. The spring 41 has its concave side facing downward and has a tendency to increase the angle of the stay formed between the link rod 32 and the arm 37. The link rod 32 is thus kept pressed against the end wall of the body 1 while the striker 40 is kept pressed against the upper face of the opening of the valve cage 31.

Another stable position of the rocker H is obtained when, starting from the position in FIG. 2, the pin 42 crosses the position of alignment with the pins 33 and 43 and passes over the pin 43. The arm 37 is then pushed downward by the spring 41 and the striker 40 comes to press against the lower face of the opening of the valve cage 31, while the link rod 32 is held in a position in which the projections 36*a*, 36*b* are in abutment against the internal wall of the body 1 (see FIG. 3).

Figure 3:
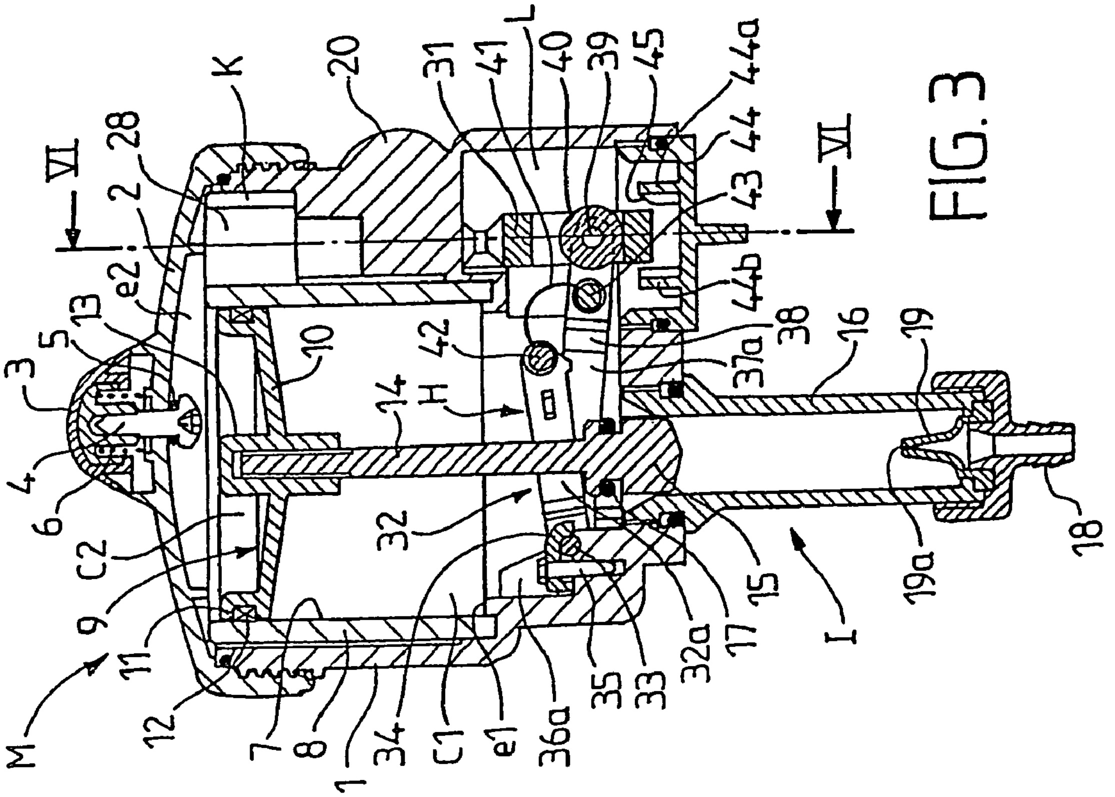
FIG. 3 shows, in a similar way to FIG. 2, the piston in a top position, with the switching means in the other stable position causing its descent.

The abrupt change in position of the rocker from FIG. 3 to FIG. 2 is obtained at the bottom of the downstroke by action of the lower part of the sleeve 13 on the branches 32*a*, 32*b* which are pushed downward.

The reversal of position of the rocker from FIG. 2 to FIG. 3 occurs when the piston 9 reaches the end of its upstroke. The upper face of the piston plunger 15 pushes the link rod 32 upward and causes the change in configuration of the rocker H from FIG. 2 to that of FIG. 3.

The lower part of the housing L is equipped with a plug 44 which, on its interior surface, has two diametrically opposed projections 44*a*, 44*b* equipped with a helical ramp 45. This plug 44 is designed to occupy two angular positions one quarter of a turn apart. In the position illustrated in FIG. 2, the projections 44*a*, 44*b* are situated out of the path of the valve cage 31 which can move freely.

When the plug 44 is turned a quarter of a turn with respect to the position of FIG. 2 or 3, the valve cage 31 is halted more or less mid-way along its travel by the projections 44 as it descends from the top position illustrated in FIG. 2. If the valve cage 31 is in the bottom position, the ramps 45, as the plug 44 is turned, lift the valve cage 31 into the intermediate position. The valve cage 31 therefore establishes a bypass between the inlet Ta and the outlet Ts of the motor in this intermediate position. This is effectively because none of the seats 21*a*–22*s* is closed.

A valve Q (FIG. 9) with a preloaded spring Qr is advantageously arranged in an opening U in the wall 24, between the inlet Ta, Ta1 and the outlet Ts1, Ts of the motor. The valve Q, by opening, connects the inlet and the outlet directly, making it possible to spare the mechanisms, particularly those situated inside the body 1, should the pressure drop suddenly rise. The head of the valve Q, in the closed position, is kept pressed in a sealed manner by the spring Qr against a seat on the wall 24 on the outlet side. On the inlet side, the spring Qr is compressed between the wall 24 and an end stop provided at the end of a valve stem.

Although the valve Q has been depicted only in the alternative form of FIG. 9, it is obvious that it could also be provided in the embodiments according to the other figures.

That being the case, the way in which the motor and the metering device work is as follows.

Let us consider a starting position corresponding to the one illustrated in FIG. 2. The piston 9 is at the end of its downstroke and the rocker H, which has just changed configuration, has raised the valve cage 31 and the plungers 23*a*, 23*s*. The inlet Ta for pressurized liquid is connected to the lower chamber C1 while the outlet Ts is connected to the chamber C2.

The liquid pressure is exerted on the underside of the piston 9 across its entire cross section and causes this piston to rise. The liquid in the chamber C2 is delivered to the outlet. The piston plunger 15 ascends in the tubular element 16 and can draw an additive from a container connected to the coupling 18.

At the end of the upstroke, the piston plunger 15 raises the link rod 32 and causes additional compression of the leaf spring 41. When the pin 42 crosses the position of alignment with the pins 33 and 43, the leaf spring 41 partially relaxes and causes an abrupt change in the configuration of the rocker. The arm 37 turns, in the clockwise direction according to the depiction of FIG. 2, about the pin 33 and the striker 40 strikes the lower wall of the valve cage 31 which abruptly moves into the bottom position as illustrated in FIGS. 3 and 6.

In this second position, the plungers 25*a*, 25*s* of the valves are in the bottom position. The chamber C1 is placed in communication with the outlet, while the chamber C2 is placed in communication with the inlet for pressurized liquid.

The liquid pressure is then exerted on the top side of the piston 9 across its entire cross section and causes it to descend.

The piston plunger 15 also descends, and this causes the valve 19 to close and the injection of the additive drawn in during the ascent. The passage of liquid is allowed by the seal 17, as the piston plunger 15 descends, from the bottom side to the top side of this piston plunger.

In order to move into the bypass position, all that is required is for the plug 44 to be turned through a quarter of a turn. The plungers 25*a* and 25*s* then occupy an intermediate position allowing liquid to pass directly from the inlet Ta to the outlet Ts.

The invention makes it possible to use, on the ascent and on the descent, the entire stroke of the piston and its full diameter. This optimizes the compactness.

The rocker H is simple, reliable and compact.

As the valve seats are formed on the body, there is little or no seat deformation. The position of the piston has no influence on the valve plunger/seat pairing. The valve sealing is good at all flow rates. The fact of bringing the inlet/outlet valves closer together (these being separated simply by the wall 24) encourages compactness and, in the bypass position, liquid does not pass into the motor.

The liner 8/ring 12 pairing allows the materials used to be modified easily to suit the application, for example according to the chemical products contained in the liquid and/or according to the temperature. The liner 8 can be changed quickly by unscrewing the cover 2, extracting the liner 8 in a translational movement, and fitting a new liner.

The invention claimed is:

1. A hydraulic motor, comprising:

a body closed at its top by a removable cover;

an exchangeable cylindrical liner located in the body interior and defining a cylindrical housing for the piston, the liner changed quickly by removing the cover and extracting the liner in a translational movement, and fitting a new liner;

a piston able to slide in a reciprocating movement in the cylindrical housing, a chamber being formed on each side of the piston;

hydraulic switching means for feeding and evacuating the respective chambers, these switching means being able to adopt two stable positions;

control means having elastic means for abruptly bringing about changes in the position of the switching means;

and triggering means able, at the end of the stroke of the piston, to bring about the change in position of the switching means, wherein the piston is a simple piston, having a closed cross section;

and the switching means are arranged in the body of the machine, radially on the outside of the cylindrical housing in which the piston slides.

2. The machine as claimed in claim 1, wherein the cylindrical liner is made of a different, more wear resistant, material than that of the body.

3. The machine as claimed in claim 1, wherein the body is cylindrical and has a first geometric axis, and the cylindrical housing for the piston has a second geometric axis parallel to the first but offset radially.

4. The machine as claimed in claim 3, wherein the switching means comprises two valves having seats selectively situated in the body, or in a piece that is fixed relative to the body, one valve letting liquid in and the other valve letting it out.

5. The machine as claimed in claim 4, wherein the valves are housed in the part of the body situated, with respect to the geometric axis of the body, on the opposite side to the geometric axis of the housing for the piston.

6. The machine as claimed in claim 4, wherein each valve comprises a cylindrical passage open at each axial end to communicate with one of the chambers delimited by the piston.

7. The machine as claimed in claim 6, wherein each passage is equipped with a seat at each of its ends, and a plunger able to move axially in the passage is able, depending on its position, to close one of the ends of the passage by pressing against the corresponding seat.

8. The machine as claimed in claim 7, wherein geometric axes of the passages of the two valves are parallel to one another and parallel to the direction of travel of the piston.

9. The machine as claimed in claim 8, wherein the passages are adjacent to one another, separated by a wall.

10. The machine as claimed in claim 7, wherein each plunger comprises, toward each end, a bulge equipped with a seal able to press against a corresponding seat, and the region substantially situated midway along the passage communicates with an inlet or outlet duct opening to the outside.

11. The machine as claimed in claim 10, wherein the inlet or outlet duct has an axis at right angles to that of the valve passage and intersects this passage.

12. The machine as claimed in claim 7, wherein the plungers of the valves are coupled to a valve cage able to move parallel to the direction of the axes of the valve passages.

13. The machine as claimed in claim 12, wherein the valve cage is arranged in the housing of the body situated on the opposite side of the valves to the cover that closes the body.

14. The machine as claimed in claim 13, wherein a plug forming an end stop is mounted such that it can be turned in the housing of the body underneath the valve cage and, in a given angular position, allows the valve cage to be halted substantially midway through its travel so as to provide a bypass function.

15. The machine as claimed in claim 12, wherein the control means for bringing about an abrupt change in the position of the switching means are formed by a rocker device directed overall at right angles to the direction of travel of the piston.

16. The machine as claimed in claim 15, wherein the rocker device comprises a link rod articulated, at its end furthest from the valve cage, to a pin borne by the body of the machine, and a rotary arm articulated to the same pin, the rotary arm being longer than the link rod and bearing, at its end farthest from the articulation pin, a striker able to move in a window of the valve cage, a leaf spring in the shape of an arc of a curve being compressed between two pins, secured respectively to the link rod and to the arm, two stable positions of the rocker corresponding to two configurations whereby the link rod is on one or other side of the arm.

17. The machine as claimed in claim 1, comprising an inlet and an outlet for liquid, wherein a valve with a preloaded spring is arranged between the inlet and the outlet so as to open should the pressure drop increase.

18. A metering device equipped with a hydraulic motor as claimed in claim 1, further comprising an injection device including a cylindrical metering body fixed to the body of the motor, coaxial with the housing for the piston of the motor, and a piston plunger coupled to the piston and sliding in the metering body.

* * * * *